(12) United States Patent
Bhaskarwar et al.

(10) Patent No.: US 10,828,517 B2
(45) Date of Patent: Nov. 10, 2020

(54) SMART FALL ARREST SYSTEM

(71) Applicant: Honeywell International Inc., Morris Plains, NJ (US)

(72) Inventors: Rahul Ramesh Bhaskarwar, Andhra Pradesh (IN); Bethamcharla Narendra Kumar, Karnataka (IN); L G Srinivasa Rao Kanakala, Andhra Pradesh (IN); Christopher Huber, Cranberry Township, PA (US)

(73) Assignee: Honeywell International Inc., Morris Plains, NJ (US)

( * ) Notice: Subject to any disclaimer, the term of this patent is extended or adjusted under 35 U.S.C. 154(b) by 24 days.

(21) Appl. No.: 15/678,760

(22) Filed: Aug. 16, 2017

(65) Prior Publication Data
US 2019/0054328 A1 Feb. 21, 2019

(51) Int. Cl.
*A62B 35/00* (2006.01)
*G01P 15/00* (2006.01)
*G01B 11/14* (2006.01)

(52) U.S. Cl.
CPC ...... *A62B 35/0025* (2013.01); *A62B 35/0075* (2013.01); *A62B 35/0068* (2013.01); *G01B 11/14* (2013.01); *G01P 15/00* (2013.01)

(58) Field of Classification Search
CPC ............ A62B 35/0025; A62B 35/0068; A62B 35/0075; A62B 35/0093; A62B 35/04; B66F 17/00; G08B 13/1427
See application file for complete search history.

(56) References Cited

U.S. PATENT DOCUMENTS

| | | | | |
|---|---|---|---|---|
| 5,522,472 | A * | 6/1996 | Shuman, Jr. | A62B 35/0056 182/3 |
| 6,695,095 | B1 * | 2/2004 | Franke | E04G 21/3261 182/3 |
| 7,893,844 | B2 * | 2/2011 | Gottlieb | G08B 21/0446 340/539.12 |

(Continued)

FOREIGN PATENT DOCUMENTS

| | | |
|---|---|---|
| JP | 201046325 A | 3/2010 |
| KR | 1020170074523 A | 6/2017 |

OTHER PUBLICATIONS

"A beginner's guide to accelerometers"; Dimension Engineering, undated and assumed 2020, downloaded from https://www.dimensionengineering.com/info/accelerometers (Year: 2020).*

(Continued)

*Primary Examiner* — Katherine W Mitchell
*Assistant Examiner* — Shiref M Mekhaeil
(74) *Attorney, Agent, or Firm* — Alston & Bird LLP

(57) ABSTRACT

A smart fall arrest system (30) is provided and includes a fall arrest device (32) and an intelligent module (34) fixed to the fall arrest device (32). The intelligent module includes a range finder (42), a user alert device (44), a processor (46) and an accelerometer module (50). The processor (46) is configured to determine a vertical clearance distance underlying a worksite based on signals from the range finder (42) and the accelerometer module (50), the processor determines if the fall arrest device (32) is appropriate and if the anchor point selected for connecting the fall arrest device (32) is at an appropriate height.

20 Claims, 6 Drawing Sheets

(56) References Cited

U.S. PATENT DOCUMENTS

| | | | | |
|---|---|---|---|---|
| 8,490,751 B2* | 7/2013 | Allington | | A62B 1/08 182/239 |
| 9,662,518 B1* | 5/2017 | Lay | | A62B 35/0068 |
| 9,852,598 B1* | 12/2017 | Thompson | | G08B 21/0446 |
| 2002/0046902 A1* | 4/2002 | Choate | | A62B 35/0056 182/3 |
| 2003/0006094 A1* | 1/2003 | Cole | | A62B 35/0056 182/3 |
| 2005/0269153 A1* | 12/2005 | Casebolt | | A62B 35/0093 182/3 |
| 2006/0055545 A1* | 3/2006 | Graef | | A62B 35/0012 340/573.1 |
| 2013/0199854 A1* | 8/2013 | Bagnaro | | A62B 35/0025 175/219 |
| 2013/0206510 A1* | 8/2013 | Casebolt | | A62B 1/10 182/241 |
| 2013/0256441 A1* | 10/2013 | Meillet | | A62B 35/0093 242/382 |
| 2013/0327591 A1* | 12/2013 | Galpin | | A62B 35/0081 182/3 |
| 2015/0014092 A1* | 1/2015 | Blaise | | A62B 35/0043 182/5 |
| 2015/0027808 A1* | 1/2015 | Baillargeon | | B66F 17/006 182/3 |
| 2015/0090527 A1* | 4/2015 | Salour | | G06K 7/10396 182/3 |
| 2015/0284968 A1* | 10/2015 | Simmons | | A62B 35/0081 182/36 |
| 2015/0375020 A1* | 12/2015 | Palet | | A62B 35/0068 248/542 |
| 2016/0107007 A1* | 4/2016 | Pollard | | A62B 35/0075 182/3 |
| 2016/0220857 A1* | 8/2016 | Rappoport | | A62B 35/0075 |
| 2016/0236018 A1* | 8/2016 | Chen | | A62B 35/0093 |
| 2016/0303407 A1* | 10/2016 | Galli | | A62B 35/0068 |
| 2017/0138070 A1* | 5/2017 | Subzda | | A62B 35/0068 |
| 2017/0193799 A1* | 7/2017 | Holub | | A62B 35/0006 |
| 2017/0225018 A1* | 8/2017 | Palet | | A62B 35/0068 |
| 2017/0232279 A1* | 8/2017 | Strohman | | A62B 35/0087 182/36 |
| 2017/0368387 A1* | 12/2017 | Fife | | A62B 35/0075 |
| 2018/0028848 A1* | 2/2018 | Pass | | A62B 35/0068 |
| 2018/0107169 A1* | 4/2018 | Hu | | A62B 35/0043 |
| 2018/0126198 A1* | 5/2018 | Troy | | A62B 35/0093 |
| 2018/0207455 A1* | 7/2018 | Thompson | | A62B 35/0093 |

OTHER PUBLICATIONS

Jost, Danny what is an accelerometer? Jul. 11, 2019. downloaded from https://www.fierceelectronics.com/sensors/what-accelerometer (Year: 2019).*

* cited by examiner

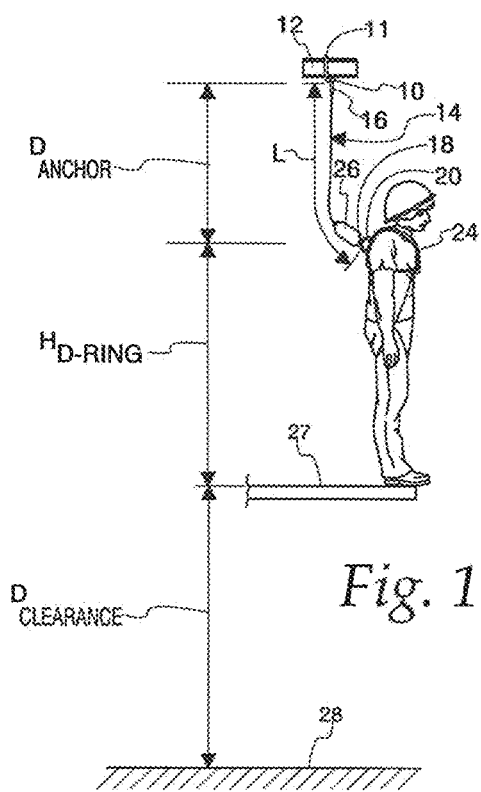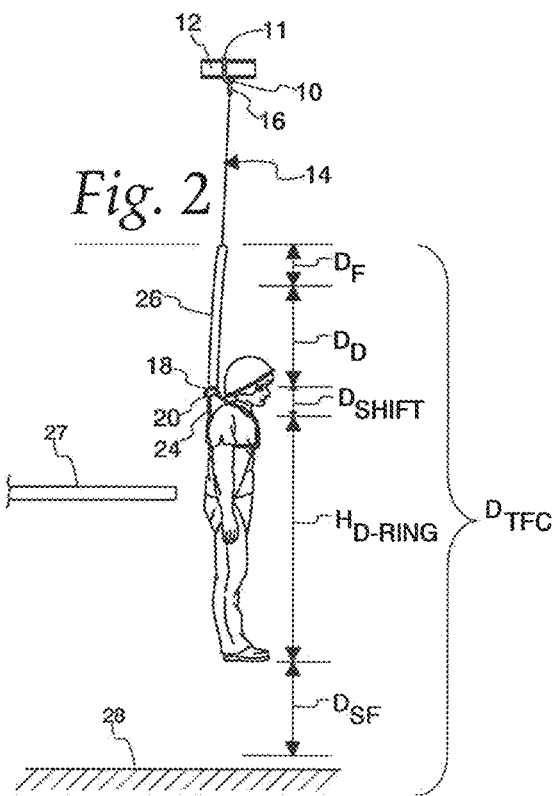

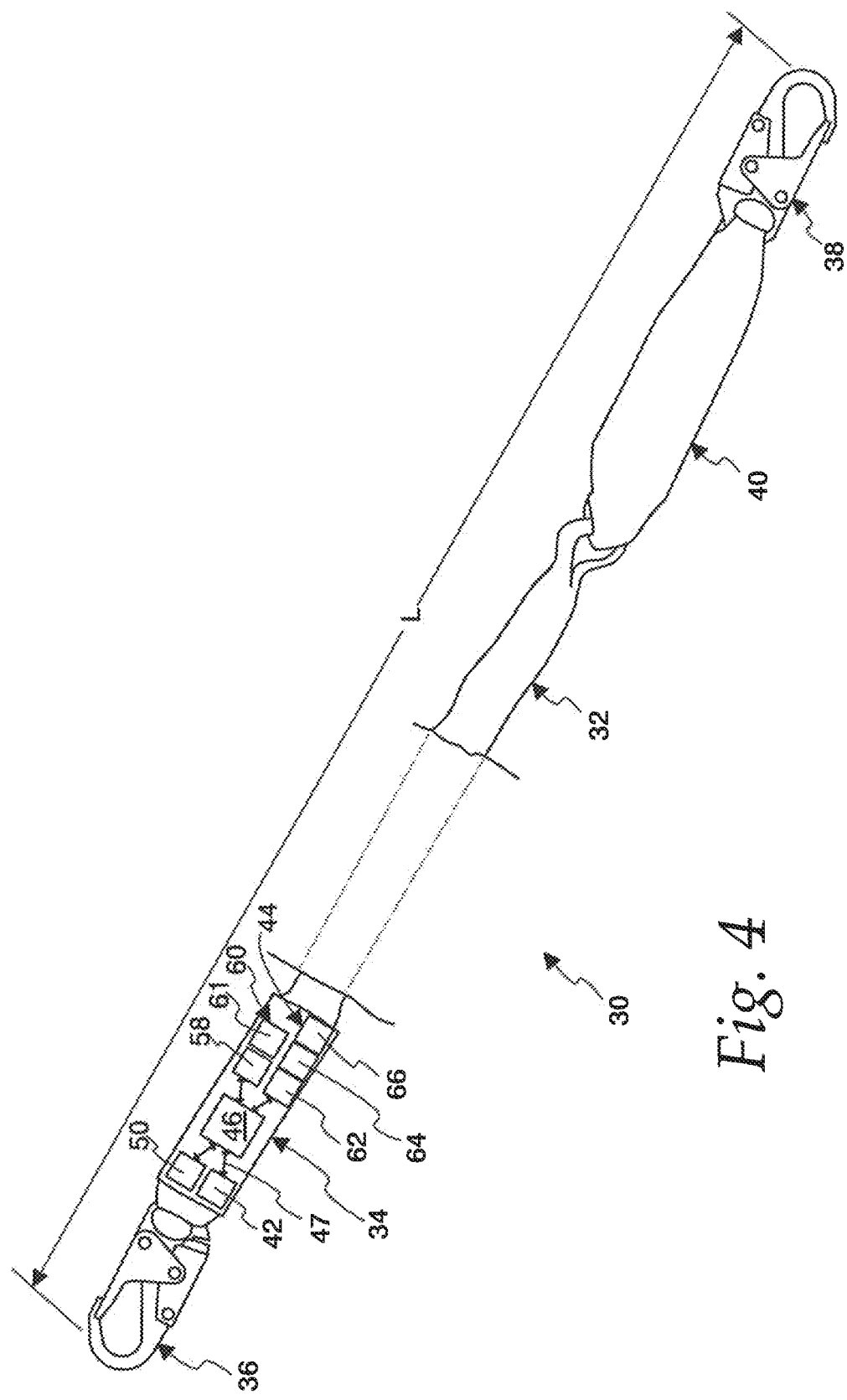

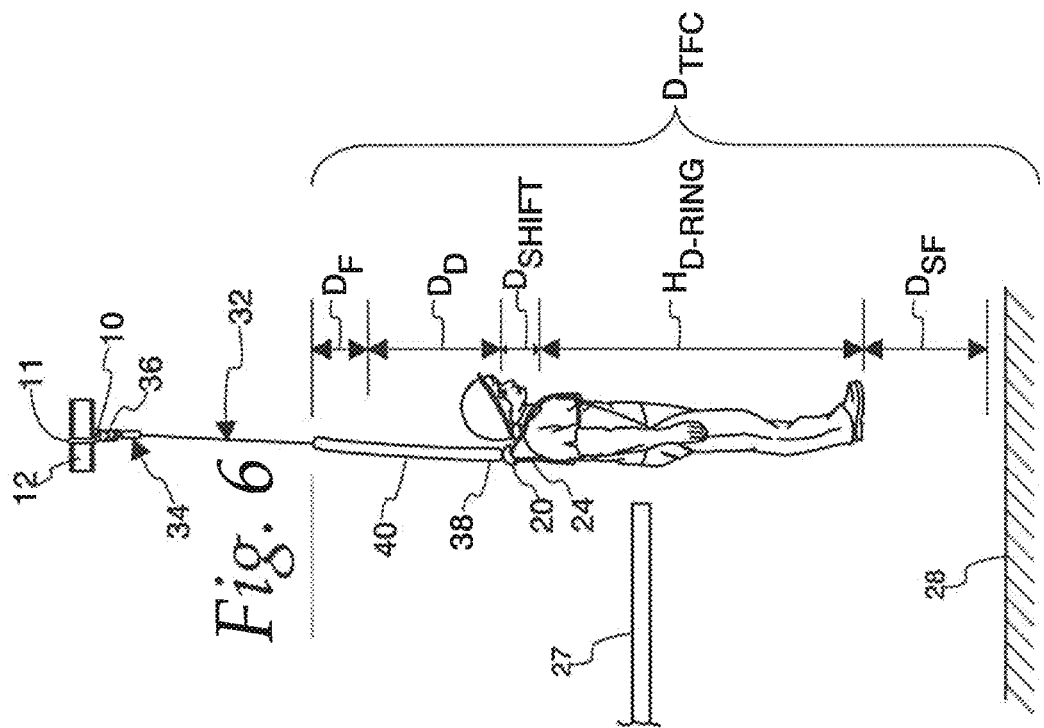
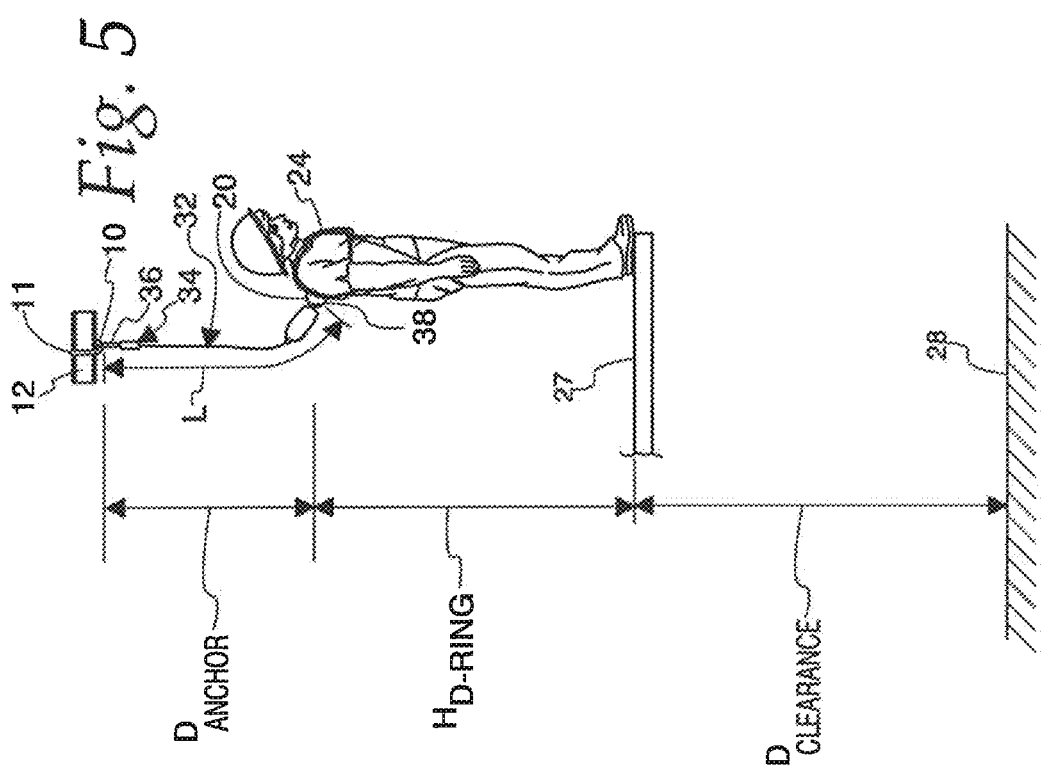

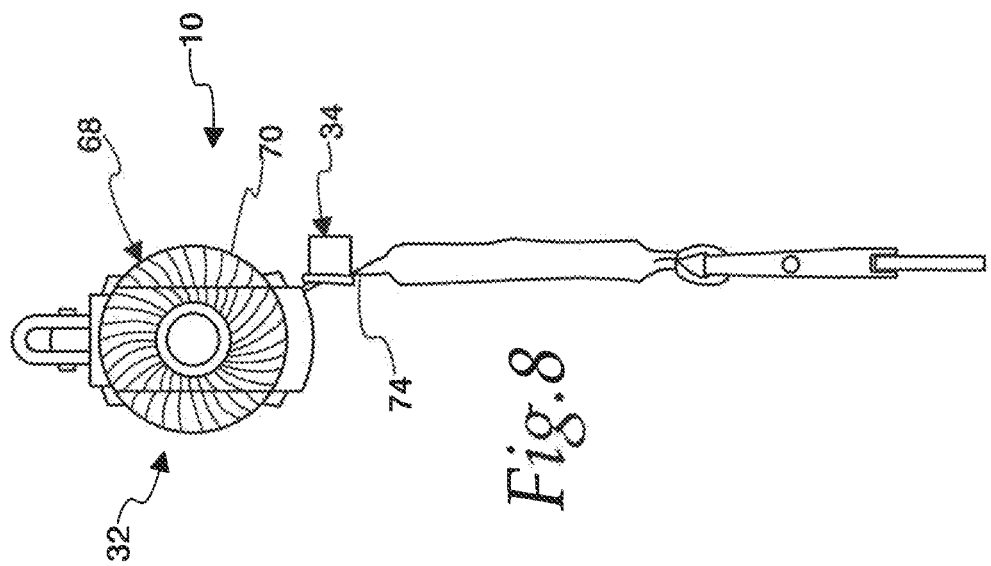
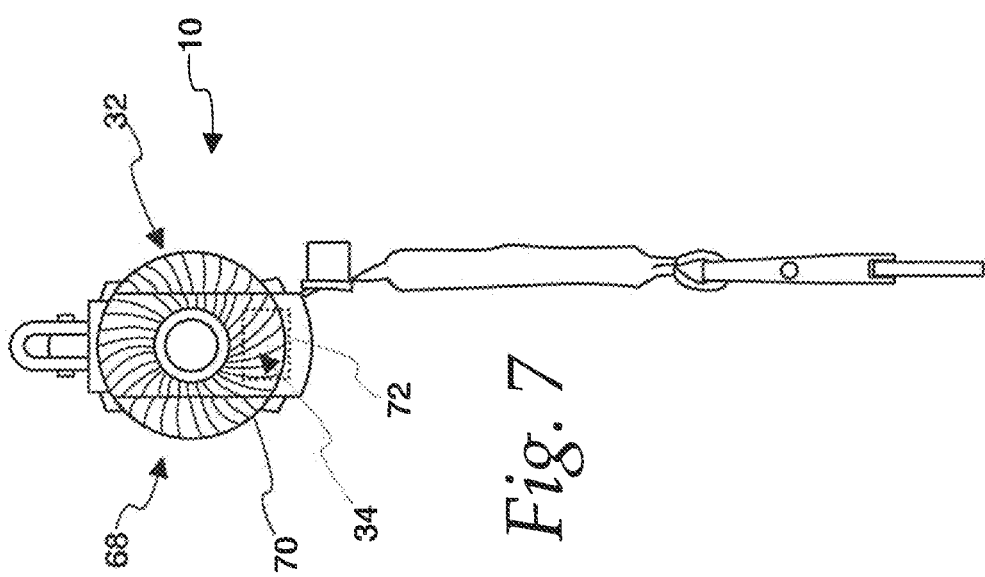

SMART FALL ARREST SYSTEM

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This disclosure relates to fall protection, and more particularly, to vertical fall protection that utilizes a lanyard and/or a self-retracting lifeline.

BACKGROUND

Falls are one of the leading causes of occupational injuries and deaths each year. Fall arrest is the form of fall protection which involves the safe stopping of a person who has fallen from a worksite. Fall arrest systems ideally absorb the energy associated with a fall, are easy to use, have the ability to successfully arrest a fall as quickly as possible, and, most importantly, prevent worker injury. In this regard, OSHA standard 1926.502(d)(16)(ii) states that a worker in a body harness weighing up to 310 lbs. shall not be exposed to a maximum arresting force (MAF) in excess of 1,800 lbs.

The most common fall arrest system is the vertical lifeline: a stranded rope, cable, or length of webbing that is connected to an anchor point, and to which the user's personal protective equipment (PPE) typically in the form of a fully body harness, is attached either directly or through a "shock absorbing" (energy absorbing) lanyard, which serves to dissipate a substantial amount of energy during a fall arrest, or otherwise limits the energy imposed on an employee. FIG. 1 illustrates a conventional vertical fall arrest system as utilized at a worksite. As seen in FIG. 1, typically the anchor point 10 is defined by an anchor connecting device 11 that is connected to an anchor 12, which is typically a structural member associated with the worksite. A fall arrest device 14, typically provided in the form of a self-retracting lifeline (SRL) or lanyard 14, will have a first connector 16 attached to the anchor/connecting device 10 and a second connector 18 attached to a connection point, typically a D-ring 20, of a full body harness 24 worn by a worker, with a shock/energy absorber device 26 typically located between the second connector 18 and the remainder of the self-retracting lifeline/lanyard 14.

With reference to FIG. 2, selection of the correct SRL/lanyard must take into consideration the total fall clearance distance, DTFC, of a potential fall. The parameters and calculation for determining the total fall clearance distance are explained in detail in OSHA Technical Manual, OSHA Instruction TED 01-00-015, dated Jul. 16, 2017, Section V: Construction Operations, Chapter 4 Fall Protection in Construction, Section III, Measurement for Assessing Fall Hazards and Controls, subsection A, Total Fall Clearance Distance for PFAS (the entire disclosure of which is incorporated herein by reference). As discussed in the referenced subsection of the OSHA Technical Manual, total fall clearance depends on the below basic factors:

A. Free Fall Distance, $D_F$, which is the distance the worker falls before the fall arrest system begins to slow the fall (OSHA standards require that the free fall distance $D_F$, be no greater than six feet).

B. the Deceleration Distance, $D_D$, which is the distance the worker will travel as the lanyard 14 and energy absorber 26 absorb the energy from the fall, (OSHA standards require that the deceleration distance be no greater than 3.5 feet), C. D-ring shift/movement, $D_{shift}$, (the distance the D-ring moves and the harness shifts when they support the worker's full weight), D. the D-ring height, $H_{D\text{-}ring}$, which is measured as the vertical distance between the D-ring 20 and the worker's shoe sole while the worker is wearing the harness 24, E. safety factor, $D_{SF}$, which is an additional distance added to other distances to ensure there is enough clearance between the worker and the lower level after a fall.

The total fall clearance distance $D_{TFC}$ is calculated by adding these factors together, with total fall clearance $D_{TFC}$ being equal to the Free Fall Distance, $D_F$, plus the deceleration distance $D_D$, plus the D-ring shift $D_{shift}$, plus the D-ring height $H_{D\text{-}ring}$, plus the safety factor $D_{SF}$:

$$D_{TFC}=D_F+D_D+D_{shift}+H_{D\text{-}ring}+D_{SF}.$$

The D-ring shift, $D_{shift}$, is often assumed to be one foot but it can vary depending on the equipment design and the manufacturer. The D-ring height, $D_{D\text{-}ring}$, is often standardized as five feet for six foot tall workers, with the shorter workers being protected using this default distance. The safety factor, $D_{SF}$, is often provided as two or three feet.

The Free Fall Distance, $D_F$, varies depending upon the linear length, L, of the lanyard 14 (or other vertical fall arrest device) and, as illustrated in FIG. 3, where the anchor point 10 is set relative to the D-ring 20 on the harness 24. If the D-ring 20 is above the anchor point 10, the Free Fall Distance, $D_F$, is equal to the lanyard length plus the vertical distance, $D_{anchor}$, from the D-ring 20 to the anchor point 10. If the D-ring 20 is below the anchor point 10, the Free Fall Distance, $D_F$, is equal to the lanyard length L minus the vertical distance $D_{anchor}$ from the D-ring 20 to the anchor point 10. If the D-ring 20 is level with the anchor point 10, the Free Fall Distance, $D_F$, equals the lanyard length L. This relationship can be expressed by the equation:

$$D_F=L-D_{anchor}$$

wherein $D_{anchor}$ is a positive number whenever the anchor point 10 is located above the D-ring 20 and a negative number whenever the anchor point 10 is located below the D-ring 20.

As seen in FIGS. 1 and 2, safe usage of the lanyard 14 requires that the vertical clearance distance, $D_{clearance}$, beneath the standing surface 27 of the worksite and the nearest underlying surface 28, plus the D-ring height, $H_{D\text{-}ring}$, must be equal to or greater than the total fall clearance distance, $D_{TFC}$. Thus, the following equation can be satisfied for safe usage of a vertical fall arrest device 14, such as a lanyard 14:

$$H_{D\text{-}ring}+D_{clearance} \geq D_{TFC}=D_F+D_D+D_{shift}+H_{D\text{-}ring}+D_{SF}.$$

Since the values for the D-ring shift, $D_{shift}$; the D-ring height, $H_{D\text{-}ring}$; and the safety factor, $D_{SF}$, are often treated as standard, the critical variables become the vertical clearance distance, $D_{clearance}$, and the variables that are dependent upon the particular fall arrest device 14 that is selected by the worker, which variables are the linear length, L, of the fall arrest device 14, and the deceleration distance, $D_D$, together with the selection of a proper anchor point 10 relative to the D-ring 20 to provide an acceptable valve for the vertical distance, $D_{anchor}$.

Selection of the wrong fall arrest device 14 and/or the selection of the wrong anchorage point 10 can result in severe injury or death.

Examples of Current Problems in the Existing System:

Problem 1: Estimation of total fall clearance

Currently the user has to manually calculate or estimate the fall clearance either by using his experience or by applying the formula.

Problem 2: While connecting the anchorage point 10 w.r.t to the D-ring 20, a wrong estimation of the free fall distance which can result in an overly large maximum arresting force (MAF):

(a) OSHA regulations require that a personal fall arrest system (PFAS) be rigged so that the user's free fall distance, $D_F$, is no greater than 6 feet (MAF will be less than 1800 lbs. of force).

(b) Increases in the free fall distance could increase the MAF beyond the regulatory limit, as well as beyond what a worker's body can safely absorb, (c) Thus, if a worker connects to an anchor point 10 that is at the wrong position, it can be very dangerous to the worker's safety/life. 3.

SUMMARY

In accordance with one feature of the invention, a smart fall arrest system is provided for arresting the fall of a user from an elevated worksite. The system includes a fall arrest device including a first connector configured to connect the device to an anchor point at the worksite and a second connector configured to connect the fall arrest device to a connection point on a harness worn by a user. An intelligent module is fixed to the fall arrest device. The intelligent module includes a range finder, a user alert device, and a processor operably connected to the range finder and the user alert device. The processor is configured to receive a signal from the range finder indicating a distance from the range finder to a surface underlying the worksite and to determine if the fall arrest device is not appropriate for the distance and, if the fall arrest device is not appropriate for the distance, to control the user alert device to provide an alert to a user.

As one feature, the intelligent module further includes an accelerometer module fixed to the fall arrest device and operably connected to the processor to transmit signals thereto. The processor is configured to determine a vertical distance between the connection point and an anchor point in response to the accelerometer module being moved from adjacent one of the connection point and the anchor point to adjacent the other of the connection point and the anchor point, to determining if the vertical distance is acceptable, and to control the user alert device to alert a user if the vertical distance is not acceptable.

In one feature, the accelerometer module, the range finder, the user alert device and the processor are all mounted in a housing fixed to the fall arrest device.

According to one feature, the accelerometer module is fixed to the fall arrest device at a location adjacent to the first connector.

As one feature, the accelerometer module is operably connected to the processor by wireless signals.

In one feature, the fall arrest device includes a fall arrest lanyard.

According to one feature, the fall arrest device includes a self-retracting lifeline.

As one feature, the self-retracting lifeline includes a housing and a lifeline extending from the housing, and wherein the intelligent module is mounted within the housing.

In one feature, the self-retracing lifeline includes a housing and a lifeline extending from the housing, and wherein the intelligent module is fixed to the lifeline.

According to one feature, the fall arrest device includes an energy absorber device.

As one feature, the intelligent module further includes a wireless transmitter operably connected to the processor, and the processor is configured to control the wireless transmitter to transmit wireless signals.

In one feature, the processor is configured to control the wireless transmitter to transmit a wireless signal indicating that the fall arrest device is not appropriate for the distance in response to the processor determining that the fall arrest device is not appropriate.

According to one feature, the user alert device includes a visual alert component.

As one feature, the visual alert component includes an LED.

In one feature, the user alert device includes an audible alert component.

According to one feature, the audible alert component is a speaker.

As one feature, the speaker issues a verbal alert in response to the processor commanding an alert.

In one feature, the range finder comprises one of an infrared range finder, a laser range finder, an ultrasonic range finder, or a radar range finder.

According to one feature, the first connector is a snap hook.

In one feature, the second connector is snap hook.

A smart fall arrest system for arresting the fall of a user from an elevated worksite, the system comprising:

A fall arrest device includes a first connector configured to connect the device to an anchor point at the worksite and a second connector configured to connect the fall arrest device to a connection point on a harness worn by a user. An intelligent module is fixed to the fall arrest device. The intelligent module includes a range finder, an accelerometer module, a user alert device, and a processor operably connected to the range finder, the accelerometer module, and the user alert device. The processor is configured to: (a) determine a clearance distance from the range finder to a surface underlying the worksite in response to a signal from the range finder indicating the distance, (b) determine an anchor distance between the connection point and an anchor point in response to the accelerometer module being moved from adjacent one of the connection point and the anchor point to adjacent the other of the connection point and the anchor point, (c) determine if either the clearance distance or the anchor distance are not acceptable, and (d) control the user alert device to alert a user if either the clearance distance or the anchor distance is unacceptable.

Other features and advantages will become apparent from a review of the entire specification, including the appended claims and drawings.

BRIEF DESCRIPTION OF THE DRAWINGS

FIGS. 1-3 are somewhat diagrammatic illustrations of a typical vertical fall arrest system and the distances that must be considered in order to safely utilize a vertical fall arrest system;

FIG. 4 is a somewhat diagrammatic illustration of a smart fall arrest system according to this disclosure;

FIGS. 5 and 6 are diagrammatic illustrations of the smart fall arrest system according to this disclosure shown in connection with a user and an anchorage point;

FIGS. 7 and 8 are somewhat diagrammatic illustrations of the smart fall arrest system according to this disclosure employed with a self-retracting lifeline.

DETAILED DESCRIPTION

Figure 3:
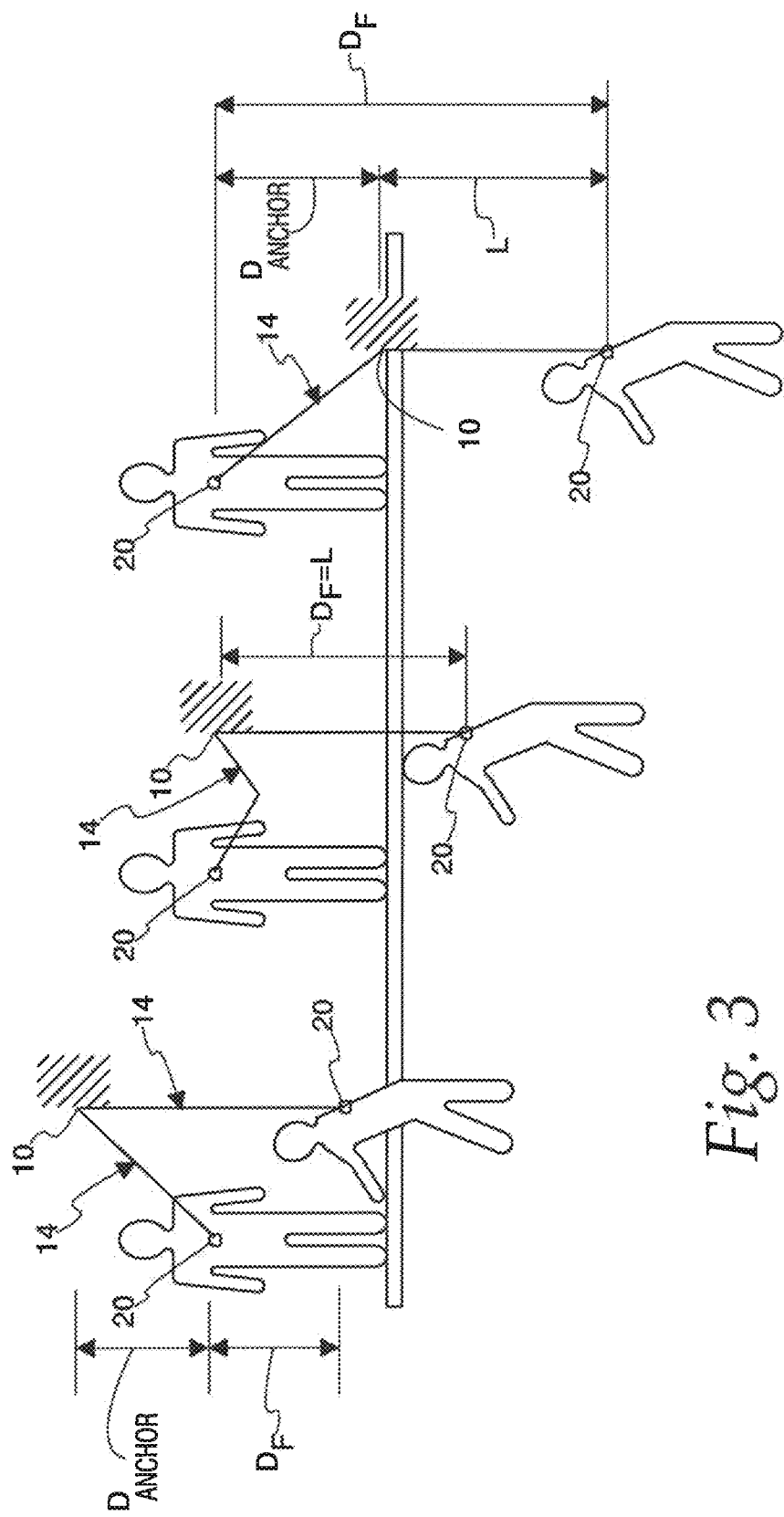

As best seen in FIG. 4, the present disclosure relates to a smart fall protection/arrest system 30 which includes a fall arrest device 32 and an intelligent module 34 fixed to the fall arrest device 32 and which can inform the user:

(a) whether or not the selected fall arrest device 32 is appropriate for the fall clearance, $D_{clearance}$.

(b) whether the anchorage point vs. D-ring location, $D_{anchor}$, protects the user against high maximum arresting force (MAF) to his body during a fall.

In the embodiment shown in FIGS. 4-6, the fall arrest device 32 is shown in the form of a lanyard 32 including: a first connector 36, shown in the form of a snap hook 36 configured to connect the fall arrest device 32 to an anchor point 10 at a worksite; a second connector 38, shown in the form of a snap hook 38, configured to connect the fall arrest device 32 to a connection point 20, typically a D-ring 20, on a harness 24 worn by a user; and an energy absorber 40 located adjacent the connector 38 to absorb the energy of a user's fall. The fall arrest device 32 has a linear length L extending between the first connector 36 and the second connector 38. In the illustrated embodiment, the lanyard 32 is formed from a strip of webbing that is fixed at one end to the connector 36 and fixed at the other end to the energy absorber 40, and the energy absorber 40 is shown in the form of a folded strip of webbing having breakable connections joining the folds, with and one end fixed to the connector 38 and the opposite end fixed to the remainder of the lanyard 32. It should be understood that this disclosure contemplates that any suitable fall arrest device 32, many of which are known, can be utilized for the fall arrest device 32 as part of the smart fall arrest system 30, including any suitable SRL or lanyard, many of which are known. Similarly, any suitable energy absorber 40, many of which are known, can be utilized as part of the fall arrest device 32. Accordingly, further details of these components are not required for an understanding of the smart fall arrest system 30 disclosed herein.

As best seen in FIG. 4, the intelligent module 34 includes a range finder 42, a user alert device 44, and a processor 46 operably connected to the range finder 42 and the user alert device 44. The processor 46 includes a memory and is configured to receive a signal 47 from the range finder 42 indicating a distance from the range finder 42 to a surface underlying the worksite and to determine if the fall arrest device 32 is not appropriate for the distance and, if the fall arrest device 32 is not appropriate for the distance, to control the user alert device 44 to provide an alert to the user.

The range finder 42 can be of any suitable design/configuration, many of which are known including, for example, an infrared range finder, a laser range finder, an ultrasonic range finder, or a radar range finder. The range finder 42 is utilized to determine the vertical clearance, $D_{clearance}$, from the standing surface 27 of the worksite to the nearest surface/obstacle 28 underlying the worksite and can be operated by a user aiming the range finder 42 at the vertically closest surface/obstacle underlying the worksite, preferably while holding the range finder 42 at the same vertical height, $H_{D\text{-}ring}$, as the D-ring 20 on the harness 24. In this regard, the processor 46 can use any suitable algorithm, many of which are known, to determine the vertical distance, $D_{clearance}$, based upon the signals from the range finder 42, with the algorithm depending upon the specific type of range finder 42 utilized in the intelligent module 34. In the illustrated embodiment, the algorithm would assume that $H_{D\text{-}ring}$ is equal to 5 feet, which is a standard assumption for determining safe use of a vertical fall arrest device. However, in some embodiments an actual measurement of the vertical height, $H_{D\text{-}ring}$, could also be utilized by the processor 46. To the extent that the user is uncertain as to which surface/obstacle provides the least amount of clearance under the worksite, the user can scan a number of surfaces and processor 46 will utilize the smallest distance indicated from the range finder 42.

In the illustrated embodiment, the intelligent module 34 further includes an accelerometer module 50 that is operably connected to the processor 46 to transmit signals 52 thereto. The processor 46 is configured to determine the vertical distance, $D_{anchor}$, between the connection point/D-ring 20 and the anchor point 10 in response to the accelerometer module 50 being moved from closely adjacent one of the connection point/D-ring 20 and the anchor point 10 to closely adjacent the other of the connection point/D-ring 20 and the anchor point 10. Again, any suitable accelerometer or combination of accelerometers, many of which are known, including, for example, triple-axis accelerometers, can be utilized in the accelerometer module 40, and any suitable algorithm, many of which are known, can be utilized by the processor 46 to determine the vertical distance based on the signals provided by the accelerometer module 50 to the processor 46.

In the illustrated embodiment, the intelligent module 34 further includes a housing 54, with the range finder 42, the user alert device 44, the processor 46, and the accelerometer module 50 all mounted in the housing 54 which is fixed to the fall arrest device 32. Typically, the signals between all of the components 42-50 will be transmitted via hardwired connections in this embodiment. In other embodiments, the accelerometer module 50 can be provided with its own housing that is fixed to the fall arrest device 32 at a location that is remote from a housing which contains the remaining components 42-46 of the intelligent module 34. Similarly, in some embodiments, the range finder 42 may also be contained in its own housing that is fixed to the fall arrest device at a location that is remote from a housing that contains the remaining components of the intelligent module 34. In some forms of these embodiments, it may be desirable for the range finder 42 and/or the accelerometer module 50 to transmit signals to the processor 46 via a hard-wired connection, while in other embodiments it may be desirable for the signals to the processor 46 to be transmitted via a wireless connection.

In the illustrated embodiment, the intelligent module 34 further includes a wireless signal transmitter 58 that is operably connected to the processor which can control the wireless transmitter 58 to transmit a wireless signal. In the illustrated embodiment, the wireless transmitter 58 is part of a wireless transceiver 60 having a receiver 61 which can also receive wireless signals for use by the processor 46.

The user alert device 44 can be of any suitable type/configuration or combination of types/configurations, many of which are known, and in the illustrated embodiment is provided in the form of a red LED light 62 together with an audible signal generator 64, both of which are activated by the processor 46 when the processor determines either that the fall arrest device 32 is not appropriate, or that the anchor point 10 is not appropriate for safe operation. The audible signal generator of the illustrated embodiment is provided in the form of a speaker 64. Additionally, the user alert device 44 can provide a means to alert the user that the system 10 is safe to use, such as by activating a green LED light 66, and/or providing an audible "Ok" signal via the audible signal generator 64.

As shown in FIGS. 7 and 8, the smart fall arrest system 10 can incorporate a fall arrest device 32 in the form of an SRL 68. In the embodiment of FIG. 7, the intelligent module 34 is mounted within a main housing 70 of the SRL 68, as shown diagrammatically by the phantom lines at 72. In the embodiment of FIG. 8, the intelligent module 34 is fixed to the lifeline 74 extending from the main housing 70.

In operation, the processor 46 receives the signals from the range finder 42 and the accelerometer module 50 and determines the vertical clearance distance, $D_{clearance}$, between the standing surface 27 of the worksite and the nearest underlying surface 28, and the vertical distance, $D_{anchor}$, between the D-ring 20 on the harness 24 and the anchor point 10 and utilizes those distances in a calculation based on the total fall clearance calculation discussed above in the Background section. Specifically, the processor 46 operates an algorithm to determine if the following equation is satisfied:

$$H_{D\text{-}ring}+D_{clearance} \geq D_{TFC}=D_F+D_D+D_{shift}+H_{D\text{-}ring}+D_{SF}.$$

In this regard, the length, L, of the fall arrest device 32, the deceleration distance, $D_D$, associated for the fall arrest device 32, the D-ring shift/movement $D_{shift}$, the D-ring height $H_{D\text{-}ring}$, and the safety factor, $D_{SF}$, are all hard coded into the processor 46 for use in the calculation. Further in this regard, while any standards could be utilized, in many embodiments, it will be desirable to utilize a D-ring height, $H_{D\text{-}ring}$, of five feet; a D-ring shift, $D_{shift}$, of one foot; and a safety factor, $D_{SF}$, of two feet, as discussed in the OSHA Manual. The length L and the deceleration distance $D_D$ will be dependent upon the specific fall arrest device 32 with which the processor 46 is being use. If the processor 46 determines that the fall arrest device 32 and/or anchor point 10 are not appropriate, the processor 46 will command the user alert device 44 to send an alert to the user to either change to a different fall arrest device 32 or to change the vertical location of anchor point 10.

The processor 46 also utilizes the vertical distance, $D_{anchor}$, between the D-ring on the harness 24 and the anchor point 10 to determine the Free Fall Distance, $D_F$, based on the equation: $D_F=L+D_{anchor}$. If $D_F$ is greater than acceptable by the OSHA standards, 6 feet, the processor 46 will activate the user alert device 44 to send an alert to the user to change the vertical location of the anchor point 10.

Figure 9:
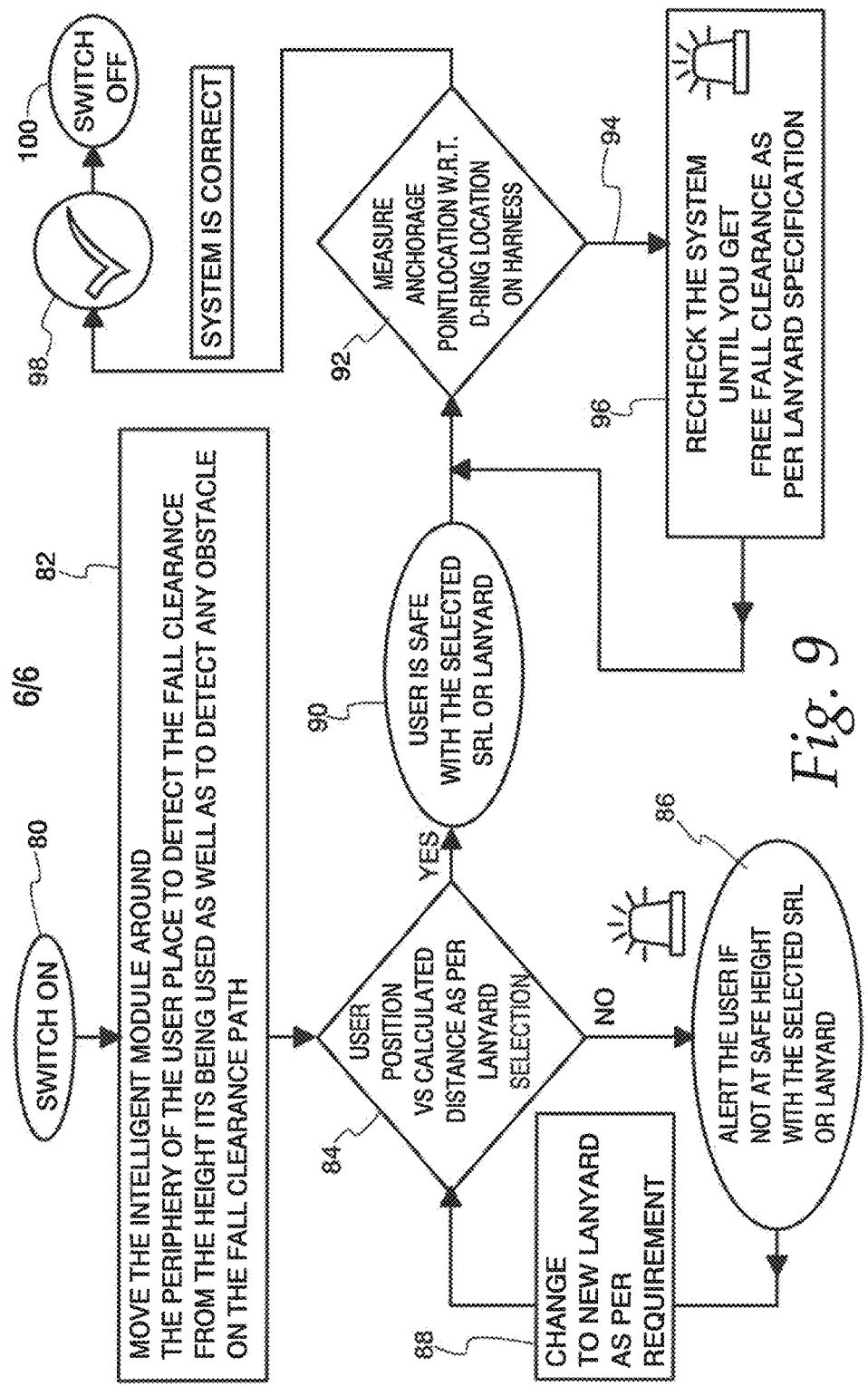
FIG. 9 is an illustration of an algorithm employed with one embodiment of the smart fall arrest system of FIGS. 3-7.

In another embodiment, as shown at 80 in FIG. 9, a user will first turn on the intelligent module 34 using a switch (not shown) provided on the module 34. Next, the user will move the intelligent module 34 around the perimeter of the worksite, with the range finder 42 aimed at the underlying surface(s)/obstacles, so as to detect the vertical clearance distance, $D_{clearance}$, as shown at 82. As shown at 84, the processor 46 will then determine if the fall arrest device 32 is appropriate for the clearance distance, $D_{clearance}$, underlying the worksite, based on an assumption that an appropriate anchor point 10 can be selected. If the processor 46 determines that the fall arrest device 32 is not appropriate, it will control the user alert device 44 to alert the user to select a different fall arrest device, as shown at 86, and the user can then select another fall arrest device 32, such as a new lanyard 32, as shown at 88. As shown at 90 and 92, if the processor 46 determines that the fall arrest device 32 is appropriate, it will then look to determine if the anchor point 10 selected by the user is appropriate based on the signals from the accelerometer module 50 as it is moved from adjacent the connection point 20 to adjacent the selected anchor point 10. If the processor determines that the anchor point 10 isn't appropriate, the processor 46 controls the user alert device 44 to alert a user to select a different anchor point 10 and to recheck the system 10, as shown at 94 and 96. If the anchor point 10 is appropriate, the processor can operate the user alert device 44 to alert the user that they system 10 is now safe and to switch off the module 34, as shown at 98 and 100.

Additionally, when a fall occurs the accelerometer module 50, or the accelerometer module 50 with strain gauges added on, can detect the fall and the processor 46 can activate the alert device 44 to alert any nearby personnel via an alarm or can command the wireless transmitter 58 to send a wireless signal to a central monitor station or a supervisor station alerting monitoring/supervising personnel that a fall has occurred.

Furthermore, an asset tracking option also can be included by adding such capability to the electronics of the module 34, such as by using tags having GPS or RFID which broadcast their location.

Incident management (ICM) can also be incorporated to identify, analyze, and correct hazards to prevent a future re-occurrence. For example, when the energy absorber 40 of the lanyard 32 opens or any issue occurs, an Incident Management Team will get information that has been broadcast from the transmitter 58.

Mobile connectivity can also be included wherein a mobile application on a smart phone or other portable device can suggest a new lanyard 32 if the selected lanyard 32 is wrong, and/or can share information like how many times particular product was used or not used, number of non-working units, etc.

As used herein, the term "processor" is intended to include any logic circuitry that responds to and processes the basic instructions/algorithms and logic operations to monitor and control other electronic devices and can be of any suitable design and configuration, many of which are known, including, for example, microprocessors. The term "memory" can include any device, or combination of devices, capable of storing data/information and being automatically accessed by a computer processor that is in communication therewith.

It can be appreciated that the smart fall arrest system 10 disclosed herein allows a user to quickly determine if the fall arrest device 32 is appropriate for the clearance distance, $D_{clearance}$, below a worksite and to determine if the location of the anchor point 10 is appropriate and safe.

It should be understood that while specific embodiments have been shown and discussed herein that will prove advantageous in many applications, the smart fall arrest system 10 disclosed herein is not limited to all the specific details depicted in the illustrations. For example, while certain forms of the connectors 36 and 38 have been shown, the disclosure contemplates any suitable connector can be utilized in the smart fall arrest system 10. Furthermore, while the smart fall arrest system 10 has been disclosed herein in connection with a lanyard 32 and two embodiments of a SRL 68, the smart fall arrest system 10 can utilize any suitable fall arrest device 32, including any suitable lanyard or SRL, or any other suitable type of fall arrest device. As a further example, while the embodiments disclosed herein contemplate that certain parameters will be hard coded into the processor 46, in some applications it may be advantageous to provide a user input device that would allow a user to input some or all of the parameters, such as, for example, the D-ring shift/movement, $D_{shift}$, the D-ring height, $H_{D-ring}$, and/or the safety factor, $D_{SF}$. Accordingly, it should be understood, that no limitation to a specific feature or detail is intended unless expressly recited in one of the appended claims.

The invention claimed is:

1. A smart fall arrest system for arresting the fall of a user from an elevated worksite, the system comprising:
    a fall arrest device comprising a first connector configured to connect the fall arrest device to an anchor point at the elevated worksite and a second connector configured to connect the fall arrest device to a connection point on a harness worn by the user, the fall arrest device having a maximum travel of the user permitted by the fall arrest system during an arrested fall;
    an intelligent module fixed to the fall arrest device, the intelligent module comprising:
        a range finder;
        an accelerometer module configured to detect a movement of the harness and measure a distance between the anchor point and the connection point based on a movement between the anchor point and the connection point;
        a user alert device; and
        a processor operably coupled to the range finder, the accelerometer module, and the user alert device, the processor configured to:
            receive a signal from the range finder indicating a distance from the range finder to a surface underlying the elevated worksite;
            receive a signal from the accelerometer module indicating the distance between the anchor point and the connection point;
            determine if the fall arrest device is suitable based on the maximum travel permitted by the fall arrest system, the distance between the elevated worksite and the surface underlying the elevated worksite, and the distance between the anchor point and the connection point; and
            in an instance in which the processor determines that the fall arrest device is not suitable for arresting the fall by the user, control the user alert device to provide an alert to the user.

2. The fall arrest system of claim 1 wherein the accelerometer module, the range finder, the user alert device and the processor are all mounted in a housing fixed to the fall arrest device.

3. The fall arrest system of claim 1 wherein the accelerometer module is fixed to the fall arrest device at a location adjacent to the first connector.

4. The fall arrest system of claim 1 wherein the accelerometer module is operably connected to the processor by wireless signals.

5. The fall arrest system of claim 1 wherein the fall arrest device comprises a fall arrest lanyard.

6. The fall arrest system of claim 1 wherein the fall arrest device comprises a self-retracting lifeline.

7. The fall arrest system of claim 6 wherein the self-retracting lifeline comprises a housing and a lifeline extending from the housing, and wherein the intelligent module is mounted within the housing.

8. The fall arrest system of claim 6 wherein the self-retracting lifeline comprises a housing and a lifeline extending from the housing, and wherein the intelligent module is fixed to the lifeline.

9. The fall arrest system of claim 1 wherein the fall arrest device comprises an energy absorber device.

10. The fall arrest system of claim 1 wherein the intelligent-module further comprises a wireless transmitter operably connected to the processor, the processor configured to control the wireless transmitter to transmit wireless signals.

11. The fall arrest system of claim 10 wherein the processor is configured to control the wireless transmitter to transmit a wireless signal indicating that the fall arrest device is not appropriate for the distance in response to the processor determining that the fall arrest device is not appropriate.

12. The fall arrest system of claim 1 wherein the user alert device comprises a visual alert component.

13. The fall arrest system of claim 12 wherein the visual alert component comprises a light emitting diode.

14. The fall arrest system of claim 1 wherein the user alert device comprises an audible alert component.

15. The fall arrest system of claim 14 wherein the audible alert component is a speaker.

16. The fall arrest system of claim 15 wherein the speaker issues a verbal alert in response to the processor commanding the alert.

17. The fall arrest system of claim 1 wherein the range finder comprises one of an infrared range finder, a laser range finder, an ultrasonic range finder, or a radar range finder.

18. The fall arrest system of claim 1 wherein at least one of the first connector and the second connector is a snap hook.

19. A smart fall arrest system for arresting the fall of a user from an elevated worksite, the system comprising:
    a fall arrest device comprising a first connector configured to connect the fall arrest device to an anchor point at the elevated worksite and a second connector configured to connect the fall arrest device to a connection point on a harness worn by the user, the fall arrest device having a total fall clearance distance permitted by the fall arrest system during an arrested fall;
    an intelligent module coupled to the fall arrest device, the intelligent module comprising:
        a range finder;
        an accelerometer module configured to:
        measure a movement of the harness with regard to the anchor point, and
        measure a distance between the anchor point and the connection point based on a movement between the anchor point and the connection point;
        a user alert device; and
        a processor operably connected to the range finder, the accelerometer module, and the user alert device, the processor configured to:
            determine a clearance distance from the range finder to a surface underlying the elevated worksite in response to receiving a signal from the range finder indicating the distance;

determine an anchor distance between the connection point and the anchor point based on the movement of the harness with regard to the anchor point;

determine the total fall clearance distance based on the clearance distance and the anchor distance to determine if the total fall clearance distance is sufficient for arresting a fall by the user from the elevated worksite;

determine suitability of the fall arrest device for arresting the fall by the user from the elevated worksite based on the total fall clearance distance; and control the user alert device to alert the user based on the determined suitability of the fall arrest device, wherein the range finder comprises one of a laser range finder, an ultrasonic range finder, or a radar range finder.

20. The fall arrest system of claim 1 wherein the maximum travel of the user permitted by the fall arrest system during an arrested fall is a predetermined total permitted fall distance based on a maximum permitted free fall distance, a maximum permitted deceleration distance, a maximum movement and a height of one or more of the first connector and the second connector, and a safety factor.

\* \* \* \* \*